(12) United States Patent
Xin et al.

(10) Patent No.: US 12,734,843 B2
(45) Date of Patent: Sep. 15, 2026

(54) HUB EMBELLISHER FIXING DEVICE

(71) Applicant: GUANGZHOU JINZHONG AUTO PARTS MANUFACTURING CO., LTD., Guangzhou (CN)

(72) Inventors: Hongping Xin, Guangzhou (CN); Xiaomin Li, Guangzhou (CN)

(73) Assignee: GUANGZHOU JINZHONG AUTO PARTS MANUFACTURING CO., LTD., Guangzhou (CN)

( * ) Notice: Subject to any disclaimer, the term of this patent is extended or adjusted under 35 U.S.C. 154(b) by 278 days.

(21) Appl. No.: 18/685,228

(22) PCT Filed: Sep. 15, 2023

(86) PCT No.: PCT/CN2023/118936
§ 371 (c)(1),
(2) Date: Feb. 20, 2024

(87) PCT Pub. No.: WO2024/125011
PCT Pub. Date: Jun. 20, 2024

(65) Prior Publication Data

US 2024/0424829 A1 Dec. 26, 2024

(30) Foreign Application Priority Data

Dec. 16, 2022 (CN) ........................ 202223379931.6

(51) Int. Cl.
*B60B 7/06* (2006.01)
*B60B 7/08* (2006.01)
*B60B 7/02* (2006.01)

(52) U.S. Cl.
CPC ................ *B60B 7/066* (2013.01); *B60B 7/08* (2013.01); *B60B 7/02* (2013.01)

(58) Field of Classification Search
CPC ........... B60B 7/065; B60B 7/066; B60B 7/08; B60B 7/10; B60B 7/02; B60B 7/04
See application file for complete search history.

(56) References Cited

U.S. PATENT DOCUMENTS 5,803,552 A * 9/1998 Kato ........................ B60B 7/066 301/37.41
7,147,289 B2 * 12/2006 Nakamura ................ B60B 7/08 301/37.31

(Continued)

FOREIGN PATENT DOCUMENTS

CN 207388744 U * 5/2018
CN 209409695 U * 9/2019

(Continued)

*Primary Examiner* — Kip T Kotter

(57) ABSTRACT

A hub embellisher fixing device comprises two clamp feet arranged opposite to each other on the back of the embellisher body and a metal clip, fixed on the embellisher body through a fixed base; each of the two clamp feet comprises a standing plate and a clamp station located at the upper position on the inner side of the standing plate; the fixed base has slots on both sides; the metal clip is consisting of a connecting part and two support parts located at both ends of the connecting part; the connecting part is formed by two connecting steel wires, and the end parts of the two connecting steel wires are bent upward and connected to form the two support parts in contact with the outer side of the clamp feet, and the two connecting steel wires are located on both sides of the fixed base and within the slots.

3 Claims, 2 Drawing Sheets

(56) References Cited

U.S. PATENT DOCUMENTS

| | | | | |
|---|---|---|---|---|
| 7,510,248 | B2 * | 3/2009 | Wang | B60B 7/10 301/37.28 |
| 8,382,211 | B2 * | 2/2013 | Renius | B60B 7/065 301/37.102 |
| 2023/0158830 | A1 * | 5/2023 | Honda | B60B 7/065 301/37.39 |

FOREIGN PATENT DOCUMENTS

| | | | | | |
|---|---|---|---|---|---|
| CN | 110406310 | A | * | 11/2019 | B60B 7/00 |
| CN | 216467159 | U | * | 5/2022 | |
| WO | WO-2018036704 | A1 | * | 3/2018 | B60B 7/065 |

* cited by examiner

HUB EMBELLISHER FIXING DEVICE

TECHNICAL FIELD

This utility model relates to automobile components, particularly to a hub embellisher fixing device.

BACKGROUND ART

Hub embellisher covers belong to automotive hub decorative components, commonly used to decorate iron hubs, but also used for decorative covers on aluminium hubs. In the case of decorative covers for aluminium hubs, it is often necessary to open installation holes or screw holes on the hub to secure the decorative cover. This requires post-processing of the hub for assembly, resulting in increased complexity in the manufacturing process and impacting the appearance of aluminium hubs.

SUMMARY

The technical problem to be solved by this utility model is to provide a hub embellisher fixing device that avoids drilling holes in the hub, has a simple fixing structure, and is easy to manufacture.

To solve the above technical problem, the technical solution of this utility model is: a hub embellisher fixing device comprising two clamp feet arranged opposite to each other on the back of the embellisher body and a metal clip for supporting the clamp feet; the two clamp feet being fixed on the embellisher body through a fixed base; the embellisher body, the two clamp feet and the fixed base being integrally injection-moulded; each of the two clamp feet comprises a standing plate and a clamp station located at the upper position on the inner side of the standing plate; the fixed base has slots on both sides; the metal clip is formed by bending and welding steel wires, consisting of a connecting part and two support parts located at both ends of the connecting part; the connecting part is formed by two connecting steel wires, and the end parts of the two connecting steel wires are bent upward and connected to form the two support parts; the two support parts are in contact with the outer side of the clamp feet, and the two connecting steel wires are located on both sides of the fixed base and within the slots.

As an improvement, the fixed base comprises a rectangular plate connecting the bases of the two clamp feet, several transverse support plates parallelly set at the bottom of the rectangular plate, and longitudinal support plates located at the ends of the transverse support plates.

As an improvement, the two sides of the rectangular plate are equipped with guide rails, and the guide rails have guiding slopes, with the slots located below the guide rails.

The beneficial effects of this utility model compared to the prior art are:

The embellisher is fixed on the hub spoke by clamping with two oppositely arranged clamp feet, eliminating the need for drilling holes in the hub surface, especially for aluminium alloy hubs. The metal clip supports the clamp feet, ensuring stability and preventing the embellisher from detaching. The metal clip is formed by bending and welding steel wires, providing a simple structure and manufacturing process.

DETAILED DESCRIPTION

The following further explains this utility model in conjunction with the drawings.

Figure 1:
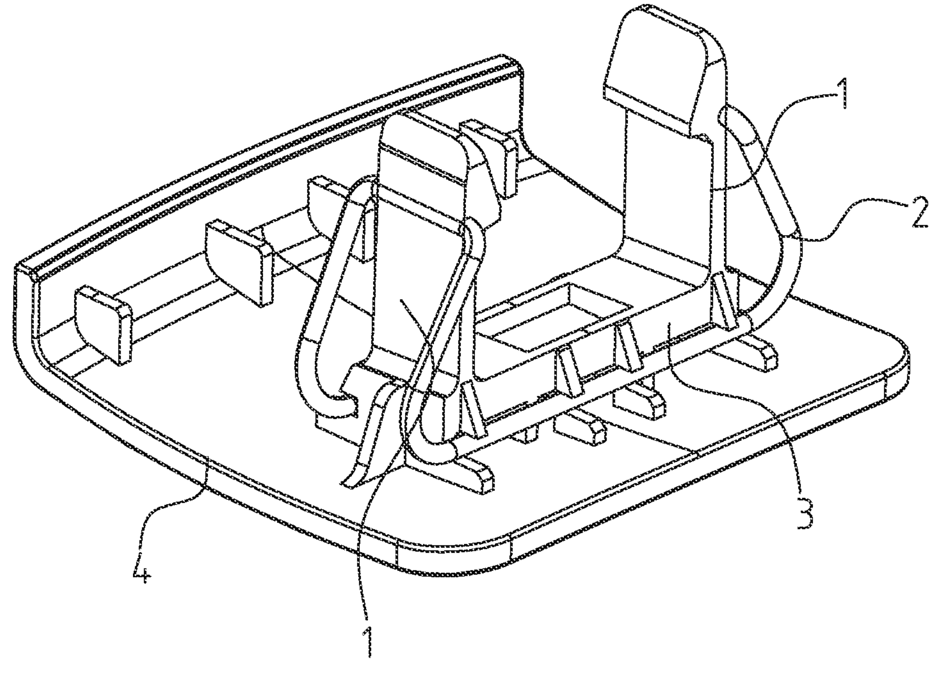
FIG. 1: Schematic diagram of the back of the hub embellisher.
Figure 2:
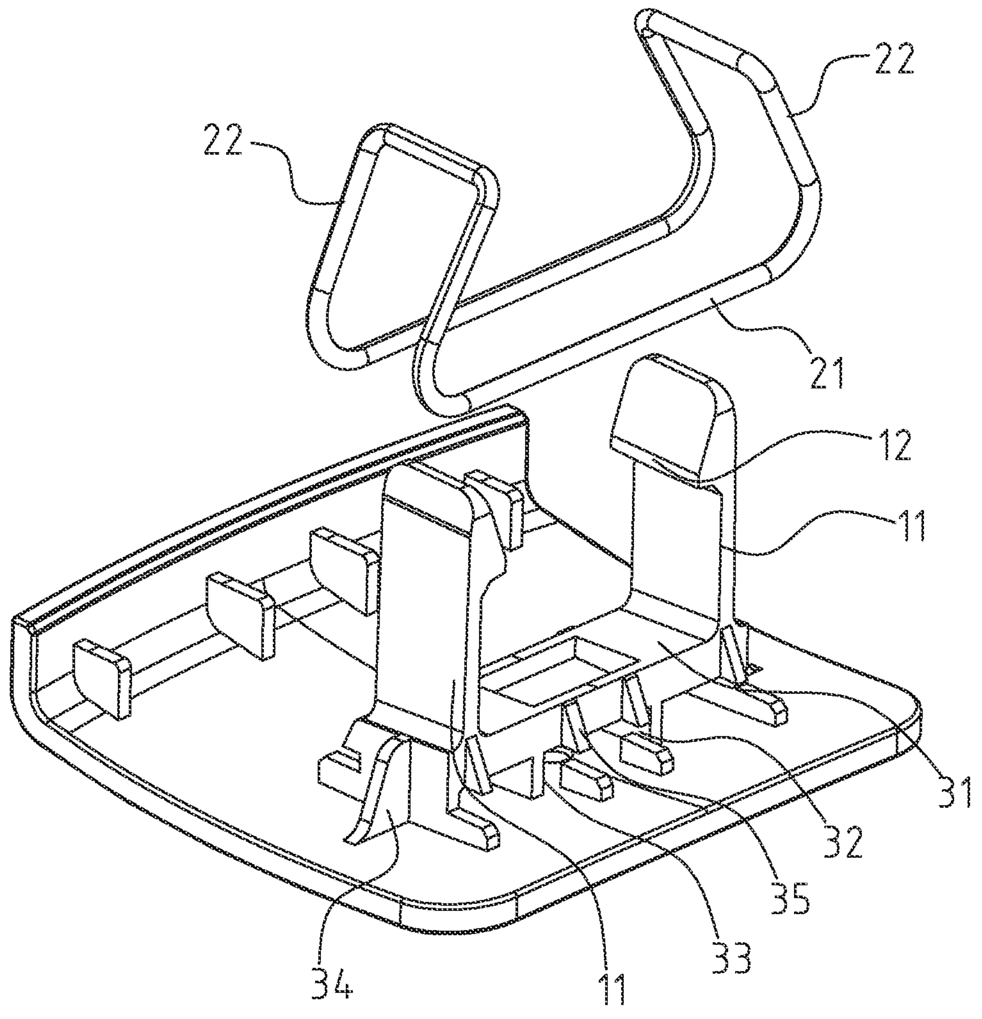
FIG. 2: Exploded view of the metal clip and clamp foot.

As shown in FIGS. 1 and 2, a hub embellisher comprises a plastic body 4 and a fixing device located on the back of the plastic body 4. The plastic body 4 is fixed on the spoke of the hub through the fixing device. The fixing device comprises two clamp feet 1 arranged opposite to each other on the back of the embellisher body and a metal clip 2 for supporting the clamp feet 1. The two clamp feet 1 are fixed on the plastic body 4 through a fixed base 3. The plastic body 4, the two clamp feet 1 and fixed base 3 are integrally injection-moulded. Each of the two clamp feet 1 comprise a standing plate 11 and a clamp station 12 located at the upper position on the inner side of the standing plate 11. After the clamping assembly, the two clamp feet 1 are located on both sides of the spoke, fixed by the clamping force of the two clamp feet 1, and the setting of the clamp station 12 provides better anti-detachment. The fixed base 3 comprises a rectangular plate 31 connecting the bases of the two clamp feet 1, several transverse support plates 33 parallelly set at the bottom of the rectangular plate 31, and longitudinal support plates 34 located at the ends of the transverse support plates 33. The rectangular plate 31 is positioned between the two clamp feet 1, the bottom of the rectangular plate 31 is connected to the plastic body 4 through the transverse support plates 33, and the transverse support plates 33 are perpendicular to the longitudinal support plates 34, ensuring high structural strength of the entire fixed base 3 with minimal deformation. The two sides of the rectangular plate 31 have slots 32, and the slots 32 are formed by notches on both sides of the transverse support plates 33. The two sides of the rectangular plate 31 in the length direction have guide rails 35 with guiding slopes, and the slots 32 are located below the guide rails 35. the metal clip 2 are formed by bending and welding steel wires, and the metal clip 2 comprise a connecting part 21 and support parts 22 located at both ends of the connecting part 21. The connecting part 21 is formed by two connecting steel wires, and the end parts of the two connecting steel wires are bent upward and connected to form the two support parts 22. The support parts 22 are in contact with the outer side of the clamp feet 1, and the two connecting steel wires are located on both sides of the fixed base 3 and within the slots 32. During installation, the metal clip 2 are inserted from above into the two clamp feet 1. When the metal clip 2 move to the position of the fixed base 3, the two connecting steel wires are guided into the slots 32 through the guide rails, completing the installation.

The principle of this utility model is to fix the embellisher on the hub spoke by clamping with two oppositely arranged clamp feet 1, avoiding the need to drill holes in the hub surface, especially for aluminium alloy hubs. the metal clip 2 support the clamp feet 1, ensuring stability and preventing the embellisher from detaching. the metal clip 2 are formed by bending and welding steel wires, providing a simple structure and manufacturing process.

The invention claimed is:

1. A hub embellisher fixing device, comprising:

two clamp feet arranged opposite to each other on a back of an embellisher body and a metal clip for supporting the clamp feet;

the two clamp feet being fixed on the embellisher body through a fixed base;

the embellisher body, the two clamp feet and the fixed base being integrally injection-moulded;

each of the two clamp feet comprises a standing plate and a clamp station located at an upper position on an inner side of the standing plate;

the fixed base has slots on both sides;

the metal clip is formed by bending and welding steel wires, consisting of a connecting part and two support parts located at both ends of the connecting part;

the connecting part is formed by two connecting steel wires, and end parts of the two connecting steel wires are bent upward and connected to form the two support parts;

the two support parts are in contact with an outer side of the clamp feet, and the two connecting steel wires are located on both sides of the fixed base and within the slots.

2. The hub embellisher fixing device according to claim 1, wherein the fixed base comprises a rectangular plate connecting bases of the two clamp feet, several transverse support plates parallelly set at a bottom of the rectangular plate, and longitudinal support plates located at ends of the transverse support plates.

3. The hub embellisher fixing device according to claim 2, wherein two sides of the rectangular plate are equipped with guide rails, and the guide rails have guiding slopes, with the slots located below the guide rails.

* * * * *